United States Patent [19]

Kodama et al.

[11] Patent Number: 4,729,972
[45] Date of Patent: Mar. 8, 1988

[54] HIGH TOUGHNESS CERAMICS AND PROCESS FOR THE PREPARATION THEREOF

[75] Inventors: Hironori Kodama; Akihiro Gotoo; Tadahiko Miyoshi; Hiroshi Sakamoto, all of Hitachi; Takaaki Suzuki, Mito, all of Japan

[73] Assignee: Hitachi, Ltd., Tokyo, Japan

[21] Appl. No.: 816,303

[22] Filed: Jan. 6, 1986

[30] Foreign Application Priority Data

Jan. 11, 1985 [JP] Japan .................................. 60-2013
Jun. 7, 1985 [JP] Japan .............................. 60-122474

[51] Int. Cl.$^4$ ...................... C04B 35/56; C04B 35/16
[52] U.S. Cl. ................................................. 501/91
[58] Field of Search ........................................ 501/91

[56] References Cited

U.S. PATENT DOCUMENTS 4,320,204 3/1982 Weaver ................................. 501/91
4,555,358 11/1985 Matsushita et al. ................... 501/91

FOREIGN PATENT DOCUMENTS 2703159 7/1977 Fed. Rep. of Germany ........ 501/91
53-26991 3/1978 Japan ................................... 501/91
59-131578 7/1984 Japan ................................... 501/91

Primary Examiner—Mark L. Bell
Attorney, Agent, or Firm—Antonelli, Terry & Wands

[57] ABSTRACT

The present invention relates to a sintered product containing silicon carbide as a main component which comprises a phase(a) containing at least one metal selected from among Al, Sc, Y and rare earth elements and oxygen, a particle phase(b) comprising at least one metal carbide selected from among carbides of Ti, Zr, Hf, Va, Nb, Ta, W and the like, a composite particle phase(c) comprising said phase(a) and said phase(b) surrounding the phase(a) and silicon carbide matrix(d) in which the above phase(a), (b) and (c) are dispersed.

The silicon carbide sintered product of the present invention exhibits a remarkably high strength and a remarkably high toughness which have not been attained up to this time, so that it can form various heat-resistant structural materials having a high reliability.

23 Claims, 2 Drawing Figures

HIGH TOUGHNESS CERAMICS AND PROCESS FOR THE PREPARATION THEREOF

BACKGROUND OF THE INVENTION

The present invention relates to novel silicon carbide ceramics. Particularly, it relates to a toughened silicon carbide which is useful as structural materials.

A silicon carbide exhibits a high heat resistance, a high oxidation resistance and an excellent high-temperature strength, so that it is expected to be widely used as a heat-resistant structural material. However, a sintered silicon carbide is fragile (i.e. the toughness is low), so that it has only a low reliability as a structural material, which is the greatest barrier for the practical use of silicon carbide ceramics.

To overcome this disadvantage, it was reported in, for example, Journal of the American Ceramic Society, 67, 571 (1984) that titanium carbide particles are dispersed in silicon carbide matrix to thereby prevent the propagation of crack in a sintered body thus improving the toughness. However, the sintered materials obtained by this method has a structure where titanium carbide particles are only dispersed in silicon carbide matrix and exhibit a fracture toughness of at most $6MN/m^{3/2}$, so that they cannot be used without anxiety as a structural material which requires a high reliability.

SUMMARY OF THE INVENTION

An object of the present invention is to provide silicon carbide ceramics having a high reliability which are tough enough to be used as various structural materials.

The present invention provides silicon carbide sintered materials having a structure where a phase (a) containing at least one metallic element selected from among aluminum, scandium, yttrium and rare earth elements and oxygen, a particle phase(b) comprising at least one metal carbide other than silicon carbide, such as titanium, zirconium, hafnium, vanadium, niobium, tantalum or wolfram carbide, and a composite particle phase(c) comprising such a phase(a) and such a particle phase(b) surrounding the phase(a) are dispersed in a matrix(d) comprising silicon carbide.

As described above, the particle phase(b) is formed around the phase(a) in the sintered silicon carbide of the present invention. In other words, the sintered silicon carbide of the present invention has a structure where the composite particle phases(c) having a structure where the grain boundary between the metal carbide particle phases(b) is filled with the phase(a) comprising at least one metallic element selected from among aluminum, scandium, yttrium and rare earth elements and oxygen (that is to say, the particle phases(b) are bonded with each other via the phase(a)), are dispersed in a matrix(d) comprising silicon carbide. It has been found that the presence of the above structure remarkably enhances the fracture toughness of a sintered silicon carbide.

FIG. 1 shows the scheme of a structure of the high toughness ceramic of the present invention. In this figure, numeral 1 refers to a phase(a) containing at least one metallic element selected from among aluminum, scandium, yttrium and rare earth elements and oxygen, these metals being generally present as an oxide. 2 is a metal carbide particle phase(b) surrounding the phase(a) and forms a composite particle phase(c) 10 together with the phase(a).

The phase(b)-constituting metal carbide must have a high melting point and be stable in silicon carbide and is preferably at least one carbide selected from among titanium, zirconium, hafnium, vanadium, niobium, tantalum and wolfram carbides. Among them, titanium or vanadium carbide or a mixture thereof are particularly preferred as a particle phase(b)-constituting metal carbide, because they are relatively light, exhibit a relatively high oxidation resistance at a high temperature and are particularly effective in enhancing the toughness of sintered silicon carbide. 3 is a silicon carbide particle which is a main component of the high toughness ceramic of the present invention and forms a matrix(d), in which the above phases are dispersed.

4 and 5 are phases comprising the same components as the ones of phase 1 and 2, respectively. That is to say, 4 and 5 show the phases(a) and (b) which are alone dispersed in the silicon carbide matrix (d).

As described above, a high toughness ceramic having a high reliability can be obtained for the first time by dispersing composite particle phases(10) having a structure where phases(1) comprising a metallic element selected from among aluminum, scandium, yttrium and rare earth elements and oxygen are present among metal carbide particles(2) to bond the particles(2) with each other via phase(1) in a silicon carbide matrix.

The reasons why the ceramic of the present invention exhibits an improved toughness are thought to be the branching and termination of crack. That is to say, the difference in thermal expansion coefficient and Young's modulus between the silicon carbide particles of the matrix and the composite particle phase causes stress around and in the composite particle phase. Crack propagating in the ceramic is deflected by this stress to be taken into the composite particle. Then, the crack generally branches, propagates on the interface between the phases(a) and (b) and is terminated in the composite particles. In some cases, the crack propagates inside of the phase(b) and deflects in the direction of cleavage of the metal carbide particle and is terminated also in the composite particle. As described above, the composite particle acts as a crack energy absorber, so that crack propagation becomes difficult in the ceramic, thus enhancing the toughness.

The high toughness ceramic of the present invention can be prepared by adding at least one metal or its compound selected from among aluminum, scandium, yttrium rare earth elements and hydride, carbide, nitride, silicide and oxide thereof, and a metal (for example, titanium, zirconium, hafnium, vanadium, niobium, tantalum or wolfram) or alloy, hydride, nitride or silicide thereof which can form a carbide in silicon carbide to silicon carbide powders and by firing the mixture at 1900° to 2300° C. either under vacuum or in an inert atmosphere.

In the firing step, a metal selected from among aluminum, scandium, yttrium and rare earth elements or a compound thereof acts as a sintering aid to give a dense sintered product. At the same time, the metals or metal compounds other than oxides react with oxygen or surface oxide film adhering to the surface of silicon carbide particle or oxygen or surface oxide film adhering to the added particle of titanium, zirconium, hafnium, vanadium, niobium, tantalum, wolfram or the like to form an oxide, thus forming an oxide phase of aluminum, scandium, yttrium or rare earth elements in the sintered product.

The average particle size of the silicon carbide to be used as a raw material is preferably from 0.1 to 2μm. If the particle size is less than 0.1μm, the handling of the raw material becomes difficult and a homogeneous sintered product is not obtained. If the particle size is more than 2μm, the dense sintering is difficult and a sintered product having a high density and a high strength is not obtained.

Preferred examples of the sintering aid include metallic aluminum and aluminum carbide, nitride and oxide and metallic yttrium and yttrium hydride. The use of these sintering aids can give a dense sintered product. When a sintering aid containing yttrium is used, the generated yttrium oxide($Y_2O_3$) has a high melting point of 2410° C., so that the obtained high toughness ceramic is advantageous in that the mechanical properties do not change until a high temperature is reached. In this connection, melting points are $Al_2O_3$: 2054° C., $La_2O_3$: 2307° C., $CeO_2$: 1950° C.

Further, in the firing step, a metal such as titanium, zirconium, hafnium, vanadium, niobium, tantalum, wolfram or a compound thereof such as hydride, nitride or silicide is reacted with silicon carbide to be converted into the corresponding carbide. At the same time, an aggregate structure of the carbide particles is formed, thus forming the above-described composite particle phase(c) which is effective in enhancing the toughness. In some cases, the silicon generated by this reaction is taken into the phase(a) comprising an oxide of aluminum, scandium, yttrium or rare earth metal and is present in the phase(a) as a simple substance, silicate or silicate glass under certain conditions.

As described above, the composition of the phase(a) varies depending upon the kind of raw materials used or the sintering conditions, and can be selected from among $Al_2O_3$, $Y_2O_3$, $La_2O_3$, $CeO_2$, $Y_4Al_2O_3$, $Al_2SiO_5$, $Y_2SiO_5$, alumino silicate glass, yttrium-silicate glass and the like.

In the above case, where the phase(a) contains silicon, even if all of the phases(a) and (b) are homogeneously dispersed in the silicon carbide matrix(d), so that the above-described composite particle phase(c) is not formed, the enhancement in the toughness of the sintered product is observed, though slightly lower than in the case where the phase(c) is formed.

It is preferred that the above composite particle(c) has a diameter of about 30 to 150 μm. If the diameter is less than 30 μm, the particle is only slightly effective in preventing crack propagation. On the contrary, if the composite particle is too large, the difference in thermal expansion coefficient between the silicon carbide matrix and the composite particle causes cracks and these cracks become defects, thus decreasing the strength of the sintered product. Further, to prepare a ceramic having a sufficiently high strength and a sufficiently high toughness, it is preferred that at least 50% by volume of the total composite particles has a diameter of 30 to 150 μm.

To form the above composite particle, it is preferred that the metal, alloy or metal hydride to be used as a raw material for the phase(b) has an average particle size of 5 to 100 μm. Such a material is treated with silicon carbide during sintering to form a fine metal carbide particle and this particle forms the composite particle phase(c) effective in enhancing the toughness together with the phase(a) containing a sintering aid as a main component. If the particle size of the metal, alloy or hydride to be used as a raw material is too small or too large, the formation of the composite particle having a diameter of 30 to 150 μm is difficult.

Further, it is preferred that the metal carbide particle phase(b) which constitutes the composite particle pahse(c) has an average particle size of 1 to 20 μm. If the metal carbide particle is too small, it will not be effective in terminating crack, while if it is too large, it will not be effective in branching crack.

The preferred amount of the phase (a) is 0.05 to 10% by volume. If the amount is too small, a sufficiently dense sintered product is not obtained and the bonding of the composite particle(c)-constituting metal carbide particles(b) with each other becomes weak. If the amount is too large, the excellent characteristics inherent to silicon carbide are lost.

The amount of the composite particle(c) as calculated from an area ratio of the section of the sintered product is preferably from 5 to 30% by volume.

The amount of the metal carbide present in the sintered product is preferably 5 to 40% by volume If the amount is too small, the toughness ia not sufficiently improved, while if it is too large, the excellent properties inherent to silicon carbide are lost.

It is preferred that a ceramic to be used as a structural material requiring a high reliability, such as a turbocharger rotor or a gas turbine rotor, has a toughness of $10MN/m^{3/2}$ or above in terms of critical stress intensity factor KIc. The ceramic of the present invention exhibits a strength of 30 kg/mm$^2$ or above, even if defects of about 100 μm are present on the surface of the ceramic or within the ceramic, thus satisfying the tolerance strength for design of the above rotors. Defects having a size of more than 100 μm which are present in the ceramic can be non-destructively found by X-ray penetration method, supersonic flaw detection method, viewing method or the like and can be removed.

The use of a ceramic having a KIc of $10MN/m^{3/2}$ or above can prevent the breakage caused by very small, unavoidable internal defects or surface flaws. Much energy is required for cracks to grow in a ceramic having a high Kic, therefore preventing the growth of the cracks, which is thought to be the reason why the characteristics of the ceramic are stable and highly reliable for a long period.

The high toughness ceramic of the present invention exhibits a high KIc of more than $10MN/m^{3/2}$, when it contains the phase(a) in an amount of 0.05 to 10% by volume and the composite particle phase(c) in an amount of 5 to 30% by volume. The growth of cracks in a ceramic having such a high KIc requires 3 to 10 times as much energy as that required in a ceramic of the prior art having a KIc of about 3 to $6MN/m^{3/2}$, so that the ceramic having such a high KIc becomes more reliable as a structural material. It is preferred that the particle size of the particle phase(b) is larger than that of the SiC matrix(d).

BRIEG DESCRIPTION OF THE DRAWINGS

DETAILED DESCRIPTION OF PREFERRED EMBODIMENTS

Figure 1:
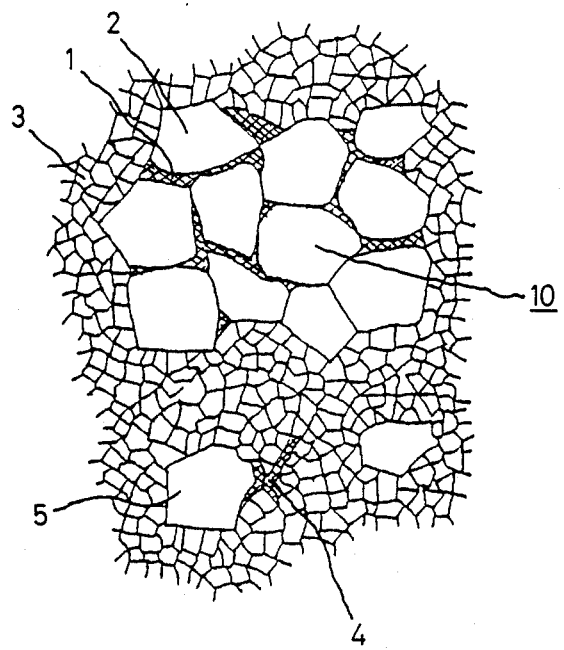
FIG. 1 is a scheme showing a structure of the high toughness ceramic of the present invention.

The present invention will be described by the following Examples, but is not limited thereby.

EXAMPLE 1

A hydride YHx (wherein x is 1 or 2) having an average particle size of 0.7 μm or a metal Y having an average particle size of 3 μm and a carbide-formable metal or hydride thereof having a particle size of 5 to 100 μm, which will be shown in Table 1, were added to α-type of SiC powder having an average particle size of 0.5 μm, in an amount of 3 to 70% by volume in terms of metal carbide, followed by mixing. 5% by volume of a silicone resin was added as a binder to the obtained powdery mixture. The obtained mixture was passed through a 16-mesh screen and granulated. The resulting granulated mixture was placed in a metal mold and molded under a pressure of 500 kg/cm² into a circular plate having a diameter of 60 mm and a thickness of 10 mm. The molded product was placed in a mold made of graphite and hot-pressed by induction heating under vacuum. The hot pressing was carried out under a pressure of 300 kg/cm² and according to a temperature profile which comprises heating at a heating rate of 20° to 40° C./minute to a temperature of 2000° to 2200° C. and cooling immediately at the same rate.

A column sample (3 mm X 4 mm X 45 mm) was prepared from the obtained sintered product and examined for strength according to JIS three-point bending test (with a span of 30 mm). The bending strength at 1200° C. under vacuum, the bending strength at the same temperature after the treatment at 1000° C. in air for 1000 hours and the bending strength after giving a Vickers indentation flaw on the surface of the sample with a load of 20 to 50 kg were measured. The fracture toughness (critical stress intensity factor KIc calculated from the area of Vickers indentation flaw and the bending strength is shown in Table 1. The KIc values were calculated according to the following equation:

$$K_{IC} = \frac{1}{0.84} \cdot \sigma \cdot s^{\frac{1}{4}}$$

wherein σ is bending strength and s is area of indentation flaw.

The X-ray diffraction analysis of the samples shown in Table 1 showed that all of the added YHx were present as $Y_2O_3$ in the sintered product, while all of the carbide-formable metals were present as metal carbide. In the sintered product obtained under the above conditions, 30 to 70% of the $Y_2O_3$ was present in the grain boundary of the composite particle phase(c) and about 50 to 75% of the metal carbide was dispersed as a sole particle, while the balance, i.e. about 25 to 50%, of the metal carbide was dispersed as an aggregate of the particles among which $Y_2O_3$ phase was present, thus forming the composite particle phase(c). Further, the X-ray microanalysis of the $Y_2O_3$ phase of the sample obtained by using Ti as a carbide-formable metal showed that the $Y_2O_3$ phase contained not only Y and O but also Si and that $Y_2SiO_5$ was present in the phase. This Si is thought to be generated by the reaction between Ti and SiC.

The raw material having the same composition as the one of the sample shown in Table 1 was sintered at a hot pressing temperature of 2200° C. with a retention time of 2 hours to obtain a sample. In this sample, all of the carbide-formable metal was converted into the corresponding metal carbide, about 50% of which was dispersed as an aggregate thereof. However, no $Y_2O_3$ phase was present among the metal carbide particles in the sample and the sample exhibited a KIc of 3 to 4MN/m$^{3/2}$ which is about equal to that of the sintered silicon carbide of the prior art, which may be because $Y_2O_3$ was evaporated during the holding of 2 hours at 2200° C. It seems necessary that the mixture of raw materials is immediately cooled to lower the temperature after sintering, though the condition may be varied depending upon the kind of additive. However, rapid cooling may cause breakage.

TABLE 1

| | Phase (a) in sintered product | | | Phase (c) in sintered product | | | Bending strength at 1200° C. (MPa) | Bending strength after treatment at 1000° C. for 1000 hr (MPa) | $K_{Ic}$(MN/m$^{3/2}$) |
|---|---|---|---|---|---|---|---|---|---|
| No. | Additive | Phase (a) | Amt. of phase (a) (Vol %) | Additive | Phase (b) | Amt. of phase (c) (Vol %) | | | |
| 1 | YHx | $Y_2O_3$ | 0.02 | VH$_2$ | VC | 15 | 720 | 700 | 8 |
| 2 | " | " | 0.05 | " | " | " | 1050 | 1040 | 12 |
| 3 | " | " | 2 | " | " | " | 1200 | 1150 | 15 |
| 4 | " | " | 5 | " | " | " | 1250 | 1200 | 16 |
| 5 | " | " | 10 | " | " | " | 1100 | 1010 | 14 |
| 6 | " | " | 15 | " | " | " | 610 | 600 | 9 |
| 7 | " | " | 5 | " | " | 2 | 1100 | 1100 | 7 |
| 8 | " | " | " | " | " | 5 | 1270 | 1250 | 13 |
| 9 | " | " | " | " | " | 10 | 1250 | 1230 | 16 |
| 10 | " | " | " | " | " | 30 | 1000 | 910 | 16 |
| 11 | " | " | " | " | " | 50 | 400 | 150 | 14 |
| 12 | " | " | 0.05 | " | " | 5 | 1000 | 1010 | 12 |
| 13 | " | " | 10 | " | " | 30 | 1100 | 990 | 16 |
| 14 | " | $Y_2SiO_5$ | 0.02 | Ti | TiC | 15 | 500 | 480 | 7 |
| 15 | " | " | 0.05 | " | " | " | 760 | 740 | 11 |
| 16 | " | " | 2 | " | " | " | 850 | 810 | 15 |
| 17 | " | " | 5 | " | " | " | 900 | 850 | 16 |
| 18 | " | " | 10 | " | " | " | 810 | 800 | 15 |
| 19 | " | " | 15 | " | " | " | 400 | 380 | 11 |
| 20 | " | " | 5 | " | " | 2 | 700 | 700 | 8 |
| 21 | " | " | " | " | " | 5 | 830 | 800 | 12 |
| 22 | " | " | " | " | " | 10 | 910 | 900 | 16 |
| 23 | " | " | " | " | " | 30 | 750 | 610 | 17 |
| 24 | " | " | " | " | " | 50 | 320 | 140 | 15 |
| 25 | " | $Y_2O_3$ | 0.05 | Zr | ZrC | 5 | 1020 | 820 | 10 |
| 26 | " | " | 5 | " | " | 15 | 1100 | 510 | 11 |
| 27 | " | " | 10 | " | " | 30 | 1000 | —* | 11 |

TABLE 1-continued

| | Phase (a) in sintered product | | | Phase (c) in sintered product | | | Bending strength at 1200° C. (MPa) | Bending strength after treatment at 1000° C. for 1000 hr (MPa) | $K_{Ic}$ (MN/m$^{3/2}$) |
|---|---|---|---|---|---|---|---|---|---|
| No. | Additive | Phase (a) | Amt. of phase (a) (Vol %) | Additive | Phase (b) | Amt. of phase (c) (Vol %) | | | |
| 28 | Y | $Y_2O_3$ | 0.05 | Hf | HfC | 5 | 980 | 800 | 10 |
| 29 | " | " | 5 | " | " | 15 | 1050 | 620 | 11 |
| 30 | " | " | 10 | " | " | 30 | 1010 | —* | 10 |
| 31 | " | " | 0.05 | Nb | NbC | 5 | 1100 | 910 | 10 |
| 32 | " | " | 5 | " | " | 15 | 1210 | 480 | 12 |
| 33 | " | " | 10 | " | " | 30 | 1030 | —* | 12 |
| 34 | " | " | 0.05 | TaH$_2$ | TaC | 5 | 1000 | 850 | 11 |
| 35 | " | " | 5 | " | " | 15 | 1050 | 500 | 11 |
| 36 | " | " | 10 | " | " | 30 | 1050 | —* | 10 |
| 37 | " | " | 0.02 | W | WC, W$_2$C | 15 | 680 | 310 | 8 |
| 38 | " | " | 0.05 | " | " | " | 970 | 420 | 12 |
| 39 | " | " | 2 | " | " | " | 1020 | 450 | 15 |
| 40 | " | " | 5 | " | " | " | 1100 | 500 | 15 |
| 41 | " | " | 10 | " | " | " | 1010 | 480 | 16 |
| 42 | " | " | 15 | " | " | " | 500 | 380 | 13 |
| 43 | " | " | 5 | " | " | 2 | 1050 | 920 | 7 |
| 44 | " | " | " | " | " | 5 | 1100 | 1010 | 11 |
| 45 | " | " | " | " | " | 10 | 1110 | 800 | 15 |
| 46 | " | " | " | " | " | 30 | 980 | —* | 16 |
| 47 | " | " | " | " | " | 50 | 420 | —* | 14 |

*decomp.

It is apparent from Table 1 that a ceramic exhibits a high KIc and a high bending strength, particularly when it contains 0.05 to 10% by volume of the $Y_2O_3$ phase(a) and 5 to 30% by volume of the composite particle phase(c), which are calculated from the area ratio of the section. Particularly, a ceramic having a bending strength at 1200° C. of 400 MPa or above and a KIc 10MN/mm$^{3/2}$ or above can be obtained.

The samples Nos. 10 and 12 shown in Table 1 were examined for their structure. This examination showed that the total amount of VC present in the sintered products were 40 and 7% by volume, respectively, about 75% of which was present as the composite particle and that both particle sizes of VC were 5 to 20 μm, while those of the composite particle varied widely over the range of 10 to 150 μm and 70% of the composite particle had a particle size of 30 to 150 μm.

The sample No. 16 shown in Table 1 was examined in a similar manner a above. The total amount of TiC present in the sintered product was 20% by volume, 75% of which was present as the composite particle. The particle size of TiC which was the phase(b) was 1 to 10 μm. The size of the composite particle(c) varied over the range of 3 to 100 μm and 50% of the particle(c) had a size of 30 to 100 μm.

EXAMPLE 2

A mixture of SiC having a particle size of 0.5 to 1.0 μm and additives having a particle size of 0.7 to 100 μm was treated according to the same procedure as the one described in Example 1 to prepare a sample shown in Table 2. These samples were examined for characteristics. In these samples, all of the added sintering aid was present as an oxide in the sintered product, about 30 to 70% of which was present in the grain boundary of the composite particle phase(c) as the phase(a). All of the added carbide-formable metal was present in the sintered product as a metal carbide, 25 to 75% of which formed the composite particle phase(c).

TABLE 2

| | Phase (a) in sintered product | | | Phase (c) in sintered product | | | Bending strength at 1200° C. (MPa) | Bending strength after the treatment at 1000° C. for 1000 hr (MPa) | $K_{Ic}$ (MN/m$^{3/2}$) |
|---|---|---|---|---|---|---|---|---|---|
| No. | Additive | Phase (a) | Amt. of phase (a) (Vol %) | Additive | Phase (b) | Amt. of phase (c) (Vol %) | | | |
| 1 | Al | Al$_2$O$_3$ | 0.05 | V | VC | 5 | 620 | 600 | 13 |
| 2 | " | " | 5 | " | " | 15 | 800 | 800 | 15 |
| 3 | " | " | 10 | " | " | 30 | 840 | 820 | 15 |
| 4 | AlN | " | 0.05 | " | " | 5 | 700 | 700 | 14 |
| 5 | " | " | 5 | " | " | 15 | 900 | 890 | 17 |
| 6 | " | " | 10 | " | " | 30 | 850 | 790 | 16 |
| 7 | Al$_2$O$_3$ | " | 0.02 | VH$_2$ | " | 2 | 400 | 380 | 9 |
| 8 | " | " | 0.05 | " | " | 5 | 770 | 750 | 11 |
| 9 | " | " | 5 | " | " | 15 | 810 | 780 | 15 |
| 10 | " | " | 10 | " | " | 30 | 720 | 570 | 15 |
| 11 | " | " | 15 | " | " | 50 | 230 | 110 | 13 |
| 12 | " | Al$_2$SiO$_5$ | 10 | Ti | TiC | 5 | 680 | 650 | 15 |
| 13 | " | " | " | " | " | 30 | 610 | 500 | 14 |
| 14 | " | " | 0.05 | " | " | " | 570 | 500 | 14 |
| 15 | " | " | " | " | " | 5 | 520 | 510 | 13 |
| 16 | " | " | 0.02 | " | " | 50 | 310 | 160 | 8 |
| 17 | Sc$_2$O$_3$ | Sc$_2$O$_3$ | 0.05 | " | " | 5 | 530 | 520 | 10 |
| 18 | " | " | 5 | " | " | 15 | 550 | 530 | 12 |
| 19 | " | " | 10 | " | " | 30 | 500 | 380 | 11 |
| 20 | Y$_2$O$_3$ | Y$_2$SiO$_5$ | 0.05 | " | " | 30 | 600 | 410 | 15 |
| 21 | " | " | 5 | " | " | 15 | 680 | 610 | 16 |

TABLE 2-continued

| | Phase (a) in sintered product | | | Phase (c) in sintered product | | | Bending strength at 1200° C. (MPa) | Bending strength after the treatment at 1000° C. for 1000 hr (MPa) | $K_{Ic}$ (MN/m$^{3/2}$) |
|---|---|---|---|---|---|---|---|---|---|
| No. | Additive | Phase (a) | Amt. of phase (a) (Vol %) | Additive | Phase (b) | Amt. of phase (c) (Vol %) | | | |
| 22 | " | " | 10 | " | " | 5 | 730 | 730 | 15 |
| 23 | LaH$_3$ | La$_2$O$_3$ | 0.05 | " | " | 5 | 510 | 500 | 11 |
| 24 | " | " | 5 | " | " | 15 | 600 | 600 | 11 |
| 25 | " | " | 10 | " | " | 30 | 490 | 380 | 10 |
| 26 | " | La$_2$SiO$_5$ | 0.05 | WSi$_2$ | WC, W$_2$C | 5 | 400 | 270 | 10 |
| 27 | " | " | 5 | " | " | 15 | 450 | 330 | 11 |
| 28 | LaH$_3$ | La$_2$SiO$_5$ | 10 | " | " | 30 | 370 | —* | 11 |
| 29 | LaC$_2$ | La$_2$O$_3$ | 0.02 | TaN | TaC | 15 | 270 | 120 | 8 |
| 30 | " | " | 0.05 | " | " | 15 | 440 | 210 | 12 |
| 31 | " | " | 10 | " | " | 15 | 530 | 330 | 11 |
| 32 | La$_2$O$_3$ | " | 15 | VN | VC | 5 | 430 | 420 | 10 |
| 33 | " | " | 10 | " | " | 30 | 620 | 400 | 10 |
| 34 | " | " | 5 | " | " | 50 | 310 | 180 | 7 |
| 35 | LaSi$_2$ | La$_2$SiO$_5$ glass | 0.02 | TiH$_2$ | TiC | 2 | 420 | 420 | 8 |
| 36 | " | La$_2$SiO$_5$ glass | 0.05 | " | " | 5 | 500 | 510 | 10 |
| 37 | " | La$_2$SiO$_5$ glass | 5 | " | " | 15 | 520 | 490 | 11 |
| 38 | " | La$_2$SiO$_5$ glass | 10 | " | " | 30 | 490 | 400 | 12 |
| 39 | " | La$_2$SiO$_5$ glass | 15 | " | " | 50 | 330 | 190 | 12 |
| 40 | CeH$_2$ | CeO$_2$ | 0.05 | VH$_2$ | VC | 5 | 540 | 530 | 10 |
| 41 | " | " | 5 | " | " | 15 | 650 | 620 | 10 |
| 42 | " | " | 10 | " | " | 30 | 500 | 370 | 11 |
| 43 | Y$_5$Si$_3$ | Y$_2$SiO$_5$ glass | 0.05 | Ti | TiC | 5 | 600 | 600 | 13 |
| 44 | " | Y$_2$SiO$_5$ glass | 5 | " | " | 15 | 670 | 650 | 15 |
| 45 | " | Y$_2$SiO$_5$ glass | 10 | " | " | 30 | 640 | 570 | 16 |
| 46 | Al$_5$Si$_3$ | Al$_2$SiO$_5$ glass | 10 | " | " | 5 | 520 | 530 | 16 |
| 47 | " | Al$_2$SiO$_5$ glass | 5 | " | " | 15 | 570 | 550 | 15 |
| 48 | " | Al$_2$SiO$_5$ glass | 0.05 | " | " | 30 | 500 | 400 | 12 |
| 49 | Y + Al (2:1) | Y$_4$Al$_2$O$_9$ | 0.05 | VH$_2$ | VC | 5 | 1010 | 1000 | 14 |
| 50 | " | " | 5 | " | " | 15 | 1210 | 1200 | 16 |
| 51 | " | " | 10 | " | " | 30 | 1070 | 880 | 16 |
| 52 | YH$_2$ | Y$_2$O$_3$ | 0.05 | V + Ti (1:1) | VC + TiC | 5 | 1100 | 1050 | 13 |
| 53 | " | " | 5 | " | " | 15 | 1270 | 1180 | 15 |
| 54 | " | " | 10 | " | " | 30 | 1230 | 990 | 16 |

*decomp.

The sample No. 1 shown in Table 2 was examined for structure. The total amount of VC present in the sintered product was 5.5% by volume, about 90% of which was present as the composite particle (c). The particle size of VC was 1 to 20 μm and the size of the composite particle varied over the range of 3 to 150 μm, while 50% of the composite particle had a particle size of 30 to 150 μm.

The sample No. 14 shown in Table 2 was examined in a similar manner as above. The total amount of TiC present in the sintered product was 40% by volume, about 75% of which was present as the composite particle (c). The particle size of TiC was 7 to 20 μm. The size of the composite particle varied over the range of 20 to 200 μm, while about 90% of the composite particle had a size of 30 to 150 μm.

Particularly, a sintered product having a KIc of 10 MN/mm$^{3/2}$ or above and a bending strength at 1200° C. of 400 MPa or above, can be obtained.

EXAMPLE 3

60% by volume of a silicon carbide powder having an average particle size of 0.5 μm, 15% by volume of a titanium carbide powder having an average particle size of 2 μm, 23% by volume (in terms of the amount in the inorganic substance comprising silicon carbide as a main component obtained by firing) of a polycarbosilane having a number-average molecular weight of 1850 which is solid at room temperature and 2% by volume of an aluminum nitride powder as a sintering aid were mixed in an attritor. Xylene was added to the obtained powder in an amount of 10 to 15 ml per 50 g of the powder, followed by mixing. The obtained powdery mixture was granulated and molded in a metal mold. The obtained molded product was heattreated in air at 350° C. for 3 hours, held at 2050° C. for 30 min and hot-pressed under a pressure of 30 MPa under vacuum.

The surface of the obtained sintered product was subjected to mirror polishing and etched, followed by the observation of the microstructure thereof. A phase in which Al, Si and 0 were detectable with a wavelength dispersion X-ray analyzer was present among crystalline particles of silicon carbide and titanium carbide. The Si contained in this phase is thought to be generated during the pyrolysis of the polycarbosilane. Further, the titanium carbide particle phase(b) was not agglomerated but dispersed uniformly.

The sintered product exhibited a bending strength of 540 MPa at 1200° C. under vacuum and a bending strength of 510 MPa at the same temperature after the treatment at 1000° C. for 1000 hr in air and had a KIc of 8 MN/m$^{3/2}$ As described above, the high toughness ceramic of the present invention has a high fracture energy, so that it is highly resistant against mechanical and heat-shock. Therefore, the ceramic of the present invention can be used as gas turbine components (nozzle or rotor), turbo-charger rotor, ball bearing, cutting machine (cutting tool or saw or), piping valve which operates with a high shock or the like.

Figure 2:
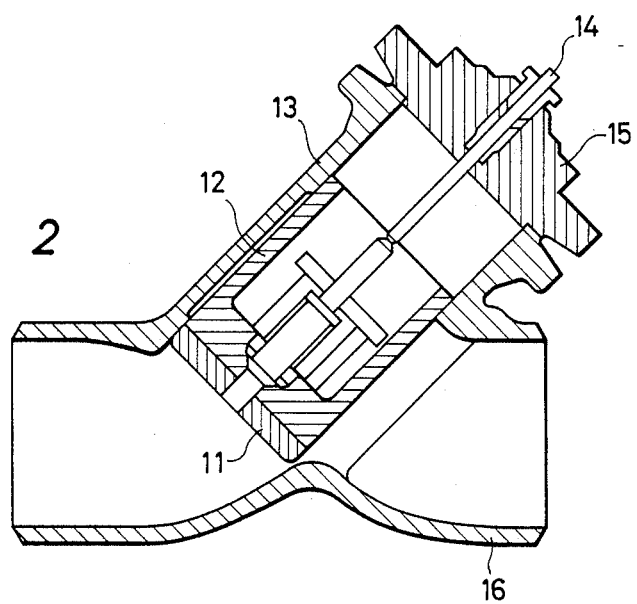
FIG. 2 shows a cross-section of the piping valve for atomic energy which is an example of the present invention.

FIG. 2 shows a case where the high toughness ceramic of the present invention is used as the disc head of a piping valve for atomic energy (section) which requires wear resistance and shock resistance.

In FIG. 2, the ceramic of the present invention was applied to a disc head 11 which requires the highest strength in a piping valve for atomic energy comprising a disc head 11, a disc 12, a cylinder 13, a shaft 14, a bonnet 15 and a pipe 16, thus obtaining a piping valve for atomic energy having a longer life and a higher operating reliability as compared with piping valves of the prior art.

As described above, the ceramic of the present invention has a remarkably high toughness and can be therefore used as a structural material, particularly as a component of an apparatus requiring heat resistance and high strength.

What is claimed is:

1. A high toughness ceramic consisting essentially of 0.05 to 10 volume % of a phase (a) of at least one of a silicate or an oxide of at least one element selected from the group consisting of aluminum, scandium, yttrium and a rare earth element, 5 to 40 volume % of a particle phase (b) of at least one metal carbide other than silicon carbide, 5 to 30 volume % of a composite particle phase (c) of a portion of said phase (a) and said particle phase (b) surrounding said portion of the phase (a) and a balance of a silicon carbide matrix (d) in which the above phases (a), (b) and (c) are dispersed.

2. A high toughness ceramic as set forth in claim 1, wherein the phase (a) consists essentially of a silicate of at least one element selected from the group consisting of aluminum, scandium, yttrium and rare earth elements.

3. A high toughness ceramic as set forth in claim 2, wherein the particle phase (a) consists essentially of a silicate glass.

4. A high toughness ceramic as set forth in claim 1, wherein the particle phase (b) has an average particle size of 1 to 20 μm.

5. A high toughness ceramic as set forth in claim 1, wherein the silicon carbide matrix (d) has an average particle size of 0.2 to 5 μm.

6. A high toughness ceramic as set forth in claim 1, wherein the composite particle phase (c) which has an average particle size of 30 to 150 μm is present in an amount of at least 50% by volume of total amount of particle phase (c).

7. A high toughness ceramic as set forth in claim 1, wherein the composite particle phase (c) is present in an amount of 5 to 30% by volume in the ceramic and at least 50% by volume of the total amount of particle phase (b) is present as the composite particle phase (c) having average particle size of 30 to 150 μm.

8. A high toughness ceramic as set forth in claim 1, wherein the phase (a) consists essentially of an oxide of aluminum, scandium, yttrium or a rare earth metal.

9. A high toughness ceramic as set forth in claim 1, wherein the phase (a) consists essentially of aluminum oxide or yttrium oxide and the particle phase (b) consists essentially of a carbide of at least one element selected from the group consisting of titanium, zirconium, hafnium, vanadium, niobium, tantalum and wolfram.

10. A high toughness ceramic as set forth in claim 7, wherein the phase (a) consists essentially of yttrium oxide and the particle phase (b) consists essentially of a carbide of titanium and/or vanadium.

11. A process for the preparation of a high toughness ceramic which comprises hot-pressing a mixture consisting essentially of (1) at least one metal selected from the group consisting of aluminum, scandium, yttrium and rare earth elements or a hydride, carbide, nitride, silicide or oxide thereof, (2) at least one metal selected from the group consisting of titanium, zirconium, hafnium, vanadium, niobium, tantalum, and wolfram or a hydride, nitride, silicide or oxide thereof having an average particle size of 5 to 100 μm and (3) a silicon carbide powder having an average particle size of 0.1 to 2 μm, to a temperature of 1900° to 2300° C. either under vacuum or in an inert gas atmosphere, and thereafter cooling said mixture, wherein said mixture is selected such that said high toughness ceramic obtained contains 0.05 to 10 volume % of oxide or silicate of at least one metal selected from the group consisting of aluminum, scandium, yttrium and rare earth elements, 5 to 40 volume % of carbide of at least one metal selected from the group consisting of titanium, zirconium, hafnium, vanadium, niobium, tantalum and wolfram, and the remainder being silicon carbide.

12. A process for the preparation of a high toughness ceramic as set forth in claim 11, which comprises adding a metallic yttrium and a metallic titanium and/or metallic vanadium to the silicon carbide, hot-pressing the obtained mixture while heating to a temperature of 2000° to 2200° C. and immediately and slowly cooling the mixture.

13. A high toughness ceramic as set forth in claim 1, wherein said phase (a) fills grain boundaries between particles of said particle phase (b).

14. A high toughness ceramic as set forth in claim 1, wherein said high toughness ceramic has a toughness of at least 10 MN/m$^{3/2}$.

15. A high toughness ceramic as set forth in claim 14, wherein said high toughness ceramic has a strength of at least 30 KG/mm$^2$.

16. A process for the preparation of a high toughness ceramic as set forth in claim 11, wherein said mixture is hot-pressed while increasing the temperature of said mixture at a rate of 20° to 40° C./min. to a temperature of 2000° to 2200° C. and immediately cooling the mixture.

17. A process for the preparation of a high toughness ceramic as set forth in claim 16, wherein said mixture is cooled at a rate of 20° to 40° C./min.

18. A process for the preparation of a high toughness ceramic as set forth in claim 11, wherein said mixture is selected such that said high toughness ceramic obtained consists essentially of 0.05 to 10 volume % of oxide of at least one metal selected from the group consisting of aluminum, scandium, yttrium and rare earth elements, 5 to 40 volume % of carbide of at least one metal selected from the group consisting of titanium, zirconium, hafnium, vanadium, niobium, tantalum and wolfram, the remainder being silicon carbide, and wherein at least a portion of said oxide of at least one metal selected from the group consisting of aluminum, scandium, yttrium and rare earth elements fills grain boundaries between particles of at least a portion of said carbide of at least one metal selected from the group consisting of tita- nium, zirconium, hafnium, vanadium, niobium, tantalum and wolfram.

19. The product formed by the process of claim 11.
20. The product formed by the process of claim 12.
21. The product formed by the process of claim 16.
22. The product formed by the process of claim 17.
23. The product formed by the process of claim 18.

* * * * *